(12) United States Patent
Sato (10) Patent No.: US 7,824,587 B2
(45) Date of Patent: Nov. 2, 2010

(54) METHOD FOR MANUFACTURING AN INTERIOR MATERIAL OF AN OPERATOR'S CAB

(75) Inventor: Kan'ichi Sato, Osaka (JP)

(73) Assignee: Komatsu Ltd., Tokyo (JP)

( * ) Notice: Subject to any disclaimer, the term of this patent is extended or adjusted under 35 U.S.C. 154(b) by 55 days.

(21) Appl. No.: 12/099,600

(22) Filed: Apr. 8, 2008

(65) Prior Publication Data

US 2008/0191384 A1 Aug. 14, 2008

Related U.S. Application Data

(62) Division of application No. 10/578,629, filed as application No. PCT/JP2004/016236 on Nov. 1, 2004, now abandoned.

(30) Foreign Application Priority Data

Nov. 11, 2003 (JP) ............................. 2003-380638

(51) Int. Cl.
*B29C 45/14* (2006.01)
(52) U.S. Cl. ...................... 264/154; 264/156; 264/261; 264/255; 264/273; 264/275
(58) Field of Classification Search ....................... None
See application file for complete search history.

(56) References Cited

U.S. PATENT DOCUMENTS

| | | | |
|---|---|---|---|
| 4,782,913 A | 11/1988 | Hoffmann | |
| 5,034,076 A | 7/1991 | Masui | |
| 5,094,318 A | 3/1992 | Maeda | |
| 5,245,141 A | 9/1993 | Fortez | |
| 5,483,028 A | 1/1996 | Holwerda | |
| 5,690,035 A | 11/1997 | Hatayama | |
| 5,851,626 A | 12/1998 | McCorry | |
| 5,854,452 A | 12/1998 | Campbell | |
| 6,186,270 B1 | 2/2001 | Roller | |

(Continued)

FOREIGN PATENT DOCUMENTS

DE 3733284 A1 * 4/1989

(Continued)

OTHER PUBLICATIONS

International Search dated Jan. 25, 2005, on Application No. PCT/JP2004/016236, 2 pages.

(Continued)

*Primary Examiner*—Edmund H. Lee
(74) *Attorney, Agent, or Firm*—Fish & Richardson P.C.

(57) ABSTRACT

The present invention provides an interior material of an operator's cab of a work machine, the interior material comprising at least a structure member and a noise absorption layer, wherein the structure member has at least one rib which is formed on an inside surface of a base portion thereof and comes into intimate contact with an inside surface of an exterior material and a hermetically sealed hollow portion is formed by the rib in intimate contact with the exterior material, and the noise absorption layer is disposed on an outside surface of the structure member. With the interior material, a work environment in the operator's cab of the work machine can be enhanced by effectively suppressing the noise entering from an outside of the operator's cab.

2 Claims, 9 Drawing Sheets

U.S. PATENT DOCUMENTS

| | | |
|---|---|---|
| 6,202,786 B1 | 3/2001 | Pfaffelhuber |
| 6,274,216 B1 | 8/2001 | Gonidec et al. |
| 6,547,301 B1 | 4/2003 | Keller |
| 6,708,626 B2 | 3/2004 | Ueda |
| 7,291,378 B2 * | 11/2007 | Cowelchuk et al. ......... 428/140 |
| 2006/0065481 A1 * | 3/2006 | Connelly ................... 181/290 |

FOREIGN PATENT DOCUMENTS

| | | |
|---|---|---|
| DE | 295 12 787 | 11/1995 |
| EP | 0 976 883 | 9/2003 |
| JP | 63-188544 | 8/1988 |
| JP | 09-221721 | 8/1997 |
| JP | 09-290696 | 11/1997 |
| JP | 2001-260146 | 9/2001 |
| JP | 2001-260765 | 9/2001 |
| JP | 3280845 | 2/2002 |
| JP | 2003-010967 | 1/2003 |
| JP | 2003-048221 | 2/2003 |
| JP | 2003-239322 | 8/2003 |

OTHER PUBLICATIONS

German Office Action (German Patent Application No. 11 2004 002 163.4), dated Apr. 27, 2009 with translation, 5 pages.

* cited by examiner

METHOD FOR MANUFACTURING AN INTERIOR MATERIAL OF AN OPERATOR'S CAB

This application is a divisional of U.S. application Ser. No. 10/578,629, filed Jan. 9, 2001, now abandoned, which claims the benefit of a PCT Application No: PCT/JP2004/016236 filed on Nov. 1, 2004, which claims priority to a foreign priority application filed in Japan as Serial No. 2003-380638 on Nov. 11, 2003. The disclosure of the prior applications are considered part of the disclosure of this application.

TECHNICAL FIELD

The present invention relates to an interior material of an operator's cab for use in work machines, work vehicles, and the like such as civil engineering/construction, agricultural, and other industrial machines and vehicles, and to a method of manufacturing the interior material.

BACKGROUND ART

In general, work machines include machines and vehicles for performing various types of works (hereinafter, referred to as work machines), for example, a civil engineering/construction machine such as a hydraulic shovel and the like, an agriculture machine such as a tractor and the like, a material handling machine, and other industrial machines, vehicles and the like. An operator's cab disposed to these work machines is placed in a bad working environment with violent noise and vibration.

Figure 8:
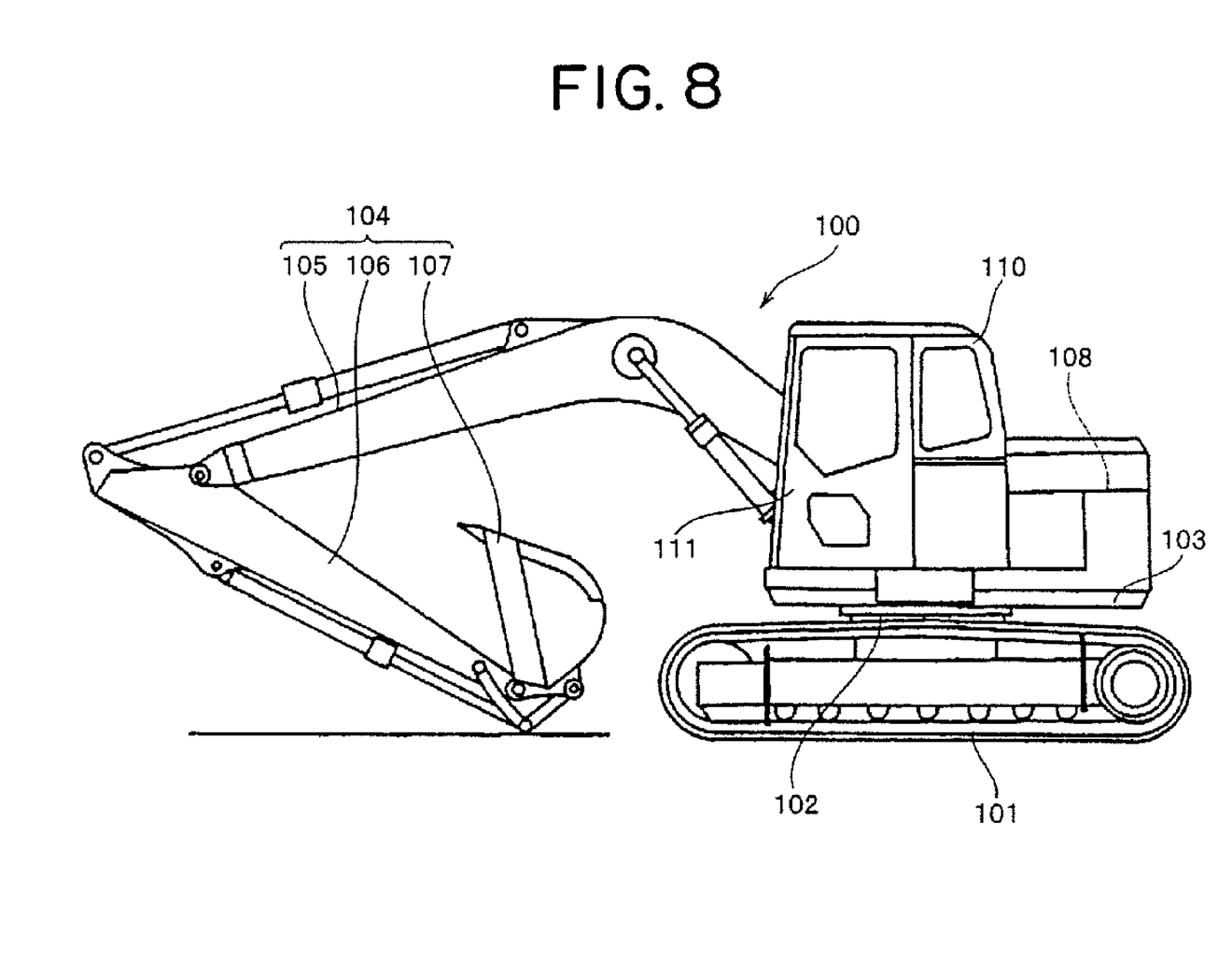
FIG. 8 is a schematic view schematically showing a hydraulic shovel.

For example, there is a hydraulic shovel 100 as one of civil engineering/construction machines as shown in FIG. 8. In the hydraulic shovel 100, an upper pivot body 103 is pivotably disposed on a lower traveling body 101 through a pivot mechanism 102. The upper pivot body 103 is provided with power units such as a work machine 104, an engine 108 and the like, and an operator's cab 110, and the like. Further, in general, this type of the work machine 104 has an attachment 107 attached thereto such as a boom 105 disposed to perform an up and down operation, an arm 106 mounted at an extreme end of the boom 105 to pivot up and down, a bucket disposed at an extreme end of the arm 106, and the like.

The operator's cab 110 is ordinarily formed in a box shape, and has a front window attached to a front surface and a window formed on a rear portion in a size as large as possible. Further, the operator's cab 110 is also provided with a window in an upper half portion on a side where the work machine 104 is installed (on a right side in a traveling direction of the vehicle) as shown in FIG. 8, and a door 111 is disposed to an opposite side of the window (on a left side in the traveling direction of the vehicle). An operator enters and exits the operator's cab 110 by opening and closing the door 111.

In the hydraulic shovel 100, drive machines such as a vehicle-mounted engine 108 and the like are disposed rearward of the operator's cab 110. In addition, the work machine 104 disposed forward of the operator's cab 110 performs work such as excavation, lifting of soil, and the like. As a result, an inside of the operator's cab 110, in which the operator drives the hydraulic shovel, has violent noise and vibration and is placed in a very bad working environment. For this reason, there is conventionally required to improve dwelling comfort in the operator's cab by suppressing noise to the operator's cab 110 in order to improve a working environment of the operator.

In contrast, for example, a passenger car is provided with noise insulation means for preventing noise from an engine into a compartment. As the noise insulation means, an action of bonding a noise insulation material to partition parts, and the like is ordinarily employed. As a method of attaching the noise insulation material, Japanese Patent Application Laid-Open No. 2003-10967 (patent document 1) discloses a method of manufacturing noise insulating body parts. In the method of manufacturing the noise insulating body parts, in order to fill body parts such as a dash lower with a noise insulation material, a noise insulation material is previously inserted into a molded vehicle part before it is foamed, the inserted noise insulation material is partly foamed by heat when the vehicle part is welded, and then the overall noise insulation material is heated and foamed. Further, a plurality of ribs are disposed in a row in the dash lower along an extending direction thereof so that they act as fitting means and reinforcing means of the noise insulation material.

Further, for example, Japanese Patent No. 3280845 (patent document 2) proposes an interior material for a passenger car. In the interior material for the passenger car, a plurality of fan-shaped continuous reinforcing ribs are disposed in contact with an inner surface of the interior material that covers a space formed adjacent to a structure member such as a pillar panel, a side roof and the like of the passenger car as well as additional ribs smaller than the reinforcing ribs interposed between the reinforcing ribs as means for preventing noise such as a zoom generated when the passenger car travels.

Patent Document 1: Japanese Patent Application Laid-Open No. 2003-10967

Patent Document 2: Japanese Patent No. 3280845

DISCLOSURE OF THE INVENTION

Problems to be Solved by the Invention

When the method of filling vehicle parts with the noise insulation material is employed to insulate noise as disclosed in the patent document 1 in a passenger car to which excellent dwelling comfort is required as described above, it is effective means to a portion such as the dash lower whose space is formed relatively small. However, in construction machines such as a hydraulic shovel whose body is intensely vibrated in its entirety as compared with passenger cars and violent noise and vibration are transmitted from an engine mounted thereon, respective panel forming bodies that form an operator's cab are large in size as a whole due to a structure thereof, and further an assembly structure of the body thereof is different from that of the passenger car. Accordingly, it is difficult to apply a system of the patent document 1 to work machines such as the construction machines and the like.

Further, when two types of ribs are directly and alternately disposed to an interior material or to an exterior material to suppress generation of vibration as in the patent document 2, it is difficult to suppress such large noise as that generated in the work machines only by a provision of the ribs.

That is, in the work machines with intense noise and vibration, it is difficult to expect a sufficient noise damping effect only by countermeasures employed in the passenger car such as filling an inside of a panel forming body that covers the outside of an operator's cab with a material having an excellent noise insulation property or providing the inside of the panel forming body with ribs, when time and effort required to manufacture the panel forming body is taken into consideration.

Accordingly, an object of the present invention, which has been made to overcome the above problems, is to provide an interior material and a panel forming body of an operator's cab of a work machine that can improve a working environment in the operator's cab by effectively suppressing noise entering the operator's cab from an outside thereof, and a method of manufacturing the interior material.

Means for Solving the Problems

To achieve the above object, a leading feature of the present invention resides in an interior material of an operator's cab of a work machine, the interior material having at least a structure member and a noise absorption layer, wherein the structure member includes at least one rib which is formed on an inside surface of a base portion thereof and comes into intimate contact with an inside surface of an exterior material, a hermetically sealed hollow portion is formed by the rib in intimate contact with the exterior material, and the noise absorption layer is disposed on an outside surface of the structure member.

Further, in the interior material of the present invention, it is preferable that, in order to more effectively absorb entering noise (noise wave), an inside surface of the structure member and a part of a surface or an entire surface of the rib are provided with the noise absorption layer, and it is preferable, for example, that the inside surface of the structure member confronting the exterior material is provided with the noise absorption layer.

Further, when a noise insulation property of the interior material is taken into consideration in the present invention, it is preferable that the structure member is formed of any one of polyurethane, polypropylene, ABS resin, and AES resin, and it is preferable that the noise absorption layer is continuous foam body and/or a woolie fiber aggregate formed of at least one of low repulsion urethane, semi-rigid urethane, PET (polyethylene terephthalate) resin, and polystyrene resin.

Further, in the present invention, it is preferable that a surface clad material is attached to a surface of the noise absorption layer opposite to the structure member, and, in particular, it is preferable that the surface clad material is subjected to a dirt prevention treatment.

According to the present invention, there is provided a panel forming body including the interior material and the exterior material of the present invention.

Next, there is provided a method of manufacturing an interior material of an operator's cab of a work machine according to the present invention, the interior material having a structure member and a noise absorption layer disposed on an outside surface of the structure member, wherein the structure member has a rib which stands from an inside surface of the base portion thereof and comes into intimate contact with an inside surface of an exterior material, and a hollow portion is formed by the rib in intimate contact with the exterior material. A leading feature of the method resides in forming the structure member having at least one rib in a desired shape by an injection molding method; forming at least one hole portion in the structure member, the hole portion passing through the base portion from an outside surface thereof to the inside surface thereof when or after the structure member is molded; attaching the structure member in which the hole portion has been formed to a mold; and molding a noise absorption layer on the outside surface of the structure member using the mold by injecting a material constituting the noise absorption layer onto the outside surface of the structure member, and at the same time, forming the noise absorption layer on the inside surface of the structure member and on a part of the surface or an entire surface of the rib through the hole portion.

Further, it is preferable that the method of manufacturing the interior material of the present invention includes, when the noise absorption layer is injection-molded: previously attaching the surface clad material to a side of the mold confronting the outside surface of the structure member; and injecting the material constituting the noise absorption layer into an interval between the structure member and the surface clad material attached to the mold.

EFFECT OF THE INVENTION

The interior material of the operator's cab of the work machine of the present invention has at least the structure member and the noise absorption layer. The structure member includes at least one rib which is formed on the inside surface of the base portion thereof and comes into intimate contact with the inside surface of the exterior material as well as the hermetically sealed hollow portion formed by the rib in intimate contact with the exterior material, and the noise absorption layer is disposed on the outside surface of the structure member.

That is, the interior material of the present invention can obtain a very excellent noise insulation effect by being simultaneously provided with a function for suppressing vibration of the exterior material by the rib in intimate contact with the exterior material and a function for absorbing the noise entered the hermetically sealed hollow portion of the structure member after it is diffusedly reflected and damped.

In addition, when the interior material of the present invention has the noise absorption layer on the inside surface of the structure member and the part of the surface of the rib, the noise which enters the hermetically sealed hollow portion of the structure member can be damped by being diffusely reflected repeatedly in the hollow portion as well as can be absorbed by the noise absorption layer on the inside surface of the structure member. Consequently, the interior material can obtain a very excellent noise insulation effect.

Further, in the present invention, when the structure member is formed of any one of polyurethane, polypropylene, ABS resin, and AES resin, these materials are excellent in molding easiness, and therefore, the structure member can be easily and securely molded even if the interior material has a complicated shape. Further, since the structure member molded by the molding material has high rigidity, it can stably keep a predetermined shape.

Furthermore, when the noise absorption layer of the interior material is the continuous foam body and/or the fiber aggregate formed of at least one of low repulsion urethane, semi-rigid urethane, PET resin, and polystyrene resin, it can be easily formed in conformity with the shape of the structure member, and communication pores/ventilation spaces can be easily formed therein. Accordingly, even if the noise absorption layer is thin in wall thickness and has complex and minute spaces formed therein, it can very effectively absorb noise, whereby the noise insulation property of the interior material can be more enhanced.

The panel forming body of the present invention is provided with the interior material having the excellent sound insulation effect as described above. Thus, when it is attached to, for example, an operator's cab of a work machine, the noise entering from the outside of the exterior material can be effectively suppressed, so that the working environment in the operator's cab can be enhanced.

According to the method of manufacturing the interior material of the operator's cab of the work machine of the present invention, the interior material has a characteristic feature as described above. As a consequence, even if the interior material of the operator's cab of the work machine of the present invention has a complex structure, it can be easily and stably manufactured. In particular, in the manufacturing method of the present invention, the structure member is molded together with the rib by the injection molding method, and thereafter, the material constituting the noise absorption layer is injected onto the outside surface of the structure member after at least one hole portion is formed in the structure member such that it passes through the base portion thereof from the outside surface to the inside surface. Accordingly, the noise absorption layer can be effectively formed on the inside surface of the structure member and on the part of the surface or the entire surface of the rib through the hole portion at the same time the noise absorption layer is molded on the outside surface of the structure member.

REFERENCE NUMERALS 1 panel forming body
1' panel forming body
1" panel forming body
2 exterior material
2' inside surface of an exterior material
3 interior material
3' interior material
3" interior material
4 structure member
4a rib
4' inside surface of a structure member
5 noise absorption layer
6 surface clad material
7 noise absorption layer
7a noise absorption layer
8 hollow portion
9 panel forming body
10 interior material
11 structure member
11a rib
11' base portion of a structure member
12 hole portion
13 noise absorption layer
14 surface clad material
15 air conditioning duct
16 hollow portion
18 lid member
19 solid propagation sound
20 noise entering a hollow portion
50 mold
51 upper mold
52 lower mold
54 mold
55 upper mold
56 lower mold

BEST MODE FOR CARRYING OUT THE INVENTION

A preferable embodiment of an interior material and a panel forming body of an operator's cab of a work machine according to the present invention as well as a method of manufacturing the interior material will be explained below in detail with reference to the drawings.

Figure 1:
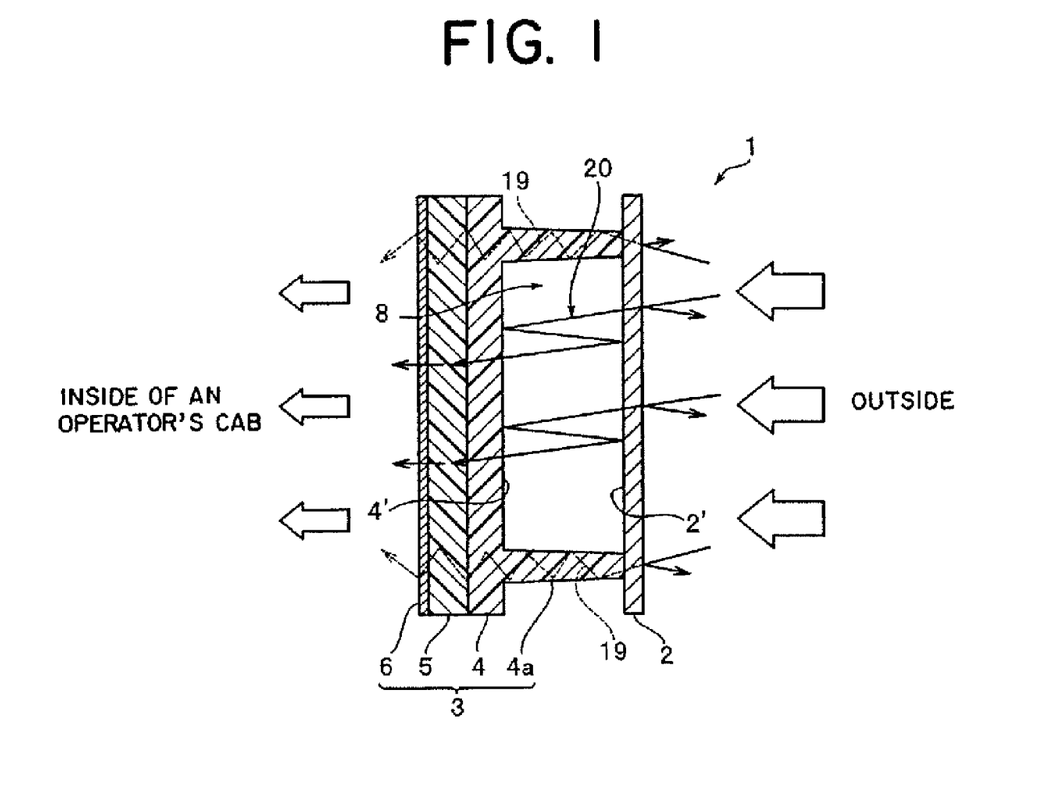
FIG. 1 is a schematic sectional view of a panel forming body having an interior material according to the present invention.

First, the interior material of the operator's cab of the work machine according to the present invention will be explained. FIG. 1 is a schematic sectional view of the interior material and the panel forming body having the interior material according to the embodiment.

The panel forming body 1 for use in the operator's cab of the work machine shown in FIG. 1 is composed of an interior material 3 which is disposed on an operator's cab side, and an exterior material 2 which is disposed in intimate contact with a rib 4a of the interior material 3 with the interior material 3 being integrated with the exterior material 2. The exterior material 2 and the interior material 3 are assembled by being joined or bonded to each other at, for example, an extreme end of a peripheral wall portion (not shown) of the interior material 3 so that they are not easily separated from each other. The panel forming body 1 arranged as described above is disposed on side portions or a periphery of an operator's cab of, for example, a work machine, and attached along a frame constituting the operator's cab. In this embodiment, for example, a hot rolled steel sheet can be used as the exterior material 2.

The interior material 3 constituting the panel forming body 1 shown in FIG. 1 has a structure member 4, a noise absorption layer 5, and a surface clad material 6. At this time, an inside surface 4' of the structure member 4 has at least one rib 4a in intimate contact with an inside surface of the exterior material 2, and a hermetically sealed hollow portion 8 is formed by the rib 4a coming into intimate contact with the exterior material 2. Note that it is sufficient if an extreme end of the rib 4a standing from the base portion of the structure member 4 is in intimate contact with the exterior material 2. That is, for example, the rib 4a may be in intimate contact with the exterior material 2 in a simply abutting state without being firmly fixed thereto, or the rib 4a may be in intimate contact with the exterior material 2 in a state that the rib 4a is bonded thereto by an adhesive and the like or in a state that it is joined to the exterior material 2 through a material having a vibration damping effect including an elastic body such as rubber and a resin material. Further, a shape of the inside surface 4' of the structure member 4 is not particularly limited, and may be in a flat state or in a curved state.

In this embodiment, although the material of the structure member 4 is not particularly limited, it is preferably formed of any one of, for example, polyurethane, polypropylene, ABS resin, and AES resin. These materials are excellent in molding easiness. For this reason, when the structure member 4 is formed of the above materials, the interior material 3 can be molded easily even if it has a complex shape. Further, since a molded structure member has high rigidity, it can keep a predetermined shape stably. Moreover, since the molding materials are also excellent in a heat insulation property, a heat insulation effect can be also expected. Thus, the molding materials can be very effectively used as the interior material for isolating the operator's cab of the work machine from the outside. In particular, when the structure member 4 is formed of rigid foamed polyurethane, an excellent noise insulation effect can be obtained because a solid propagation of the structure member can be effectively suppressed as described below in detail.

Further, in the interior material 3, the noise absorption layer 5 is formed on the outside surface of the structure member 4, and further the surface clad material 6 is formed on the surface of the noise absorption layer 5 opposite to the structure member 4. Although the material of the noise absorption layer 5 is not particularly limited, it is preferably a layer of a continuous foam body and/or a woolie fiber aggregate formed of at least any one of, for example, low repulsion urethane, semi-rigid urethane, PET resin, and polystyrene resin. The continuous foam body and the fiber aggregate can be easily molded in conformity with the structure member 4, and communication pores/ventilation spaces can be easily formed therein. For this reason, since complicated minute spaces are formed in the noise absorption layer 5, noise which had entered the noise absorption layer 5 can be very effectively absorbed even if it has a small wall thickness. Note that, in this embodiment, the wall thickness of the noise absorption layer 5 is not particularly limited and may be appropriately set according to is an object.

Further, the surface clad material 6 can be appropriately selected and used from, for example, vinyl leather, a foamed polyolefin material (for example, trade name "PEF" manufactured by Toray Industries, Inc.) having a leather-like sheet on a surface, high density fiber fabric having water repellency, air permeability, and excellent feeling of touch on a surface, and the like. Note that when the polyolefin material having the leather-like sheet is used, a decoration property can be enhanced by forming crimped patterns on a surface thereof or forming another patterns by emboss processing. Further, when the fiber fabric is used, the decorating property can be enhanced by color tone and inherent outside appearance. Furthermore, when the surface clad material 6 is subjected to a dirt prevention treatment, the interior material can be prevented from becoming dirty and the surface of the interior material 3 can be kept clean. Note that the surface clad material 6 may be formed on, for example, an outside surface of a peripheral wall portion of the structure member 4, in addition to that it is formed on the noise absorption layer 5.

In the panel forming body 1 configured as described above, when noise enters the inside of the operator's cab through the interior material 3 from the outside of the exterior material 2, first, a part of the noise is reflected on the outside surface of the exterior material 2 and remaining noise passes through an entire surface of the exterior material 2 and enters the structure member 4. At this time, in the interior material 3, the rib 4a of the structure member 4 is in intimate contact with the exterior material 2. Consequently, the vibration of the exterior material 2 generated when the noise enters it can be effectively suppressed, from which an excellent noise insulation effect can be obtained.

In contrast, a part of the noise that has entered the structure member 4 through the exterior material 2 is transmitted by a solid propagation through the inside of the rib 4a that is in intimate contact with the exterior material 2, and most part of other noise 20 enters the hermetically sealed hollow portion 8 through the exterior material 2. At this time, solid propagation noise 19 propagating in the rib is gradually damped during the solid propagation in the rib, and absorbed by the sound absorption layer 5 disposed on the outside surface of the structure member.

In contrast, the noise 20, which has entered the hermetically sealed hollow portion 8 through the exterior material 2, is gradually damped by being diffusely reflected (echoed) repeatedly on the inside surface 4' of the structure member 4, on the surface of the rib 4a, and further on the inside surface 2' of the exterior material 2 in the hollow portion 8, and thereafter absorbed by the noise absorption layer 5.

That is, according to the interior material 3 of this embodiment, the vibration of the exterior material 2 can be suppressed by the rib 4a in contact with the exterior material 2, and the noise 19 which is transmitted by the solid propagation in the rib 4a of the structure member 4 can be damped and absorbed by the noise absorption layer 5. Further, the noise 20 which enters the hermetically sealed hollow portion 8 of the structure member 4 can be absorbed by the noise absorption layer 5 after it is diffusely reflected and damped. With this operation, a sound pressure level of the noise that enters from the outside of the exterior material 2 can be greatly reduced by the interior material 3. As a consequence, a very excellent noise insulation effect can be obtained as compared with, for example, conventionally used noise insulation means (for example, patent document 1) and noise proof means (for example, patent document 2).

In particular, when the structure member 4 is composed of a material which is excellent in a damping characteristic and can effectively damp solid vibration, for example, rigid foamed polyurethane as described above, it is possible to accelerate damping of the noise 19 transmitted by the solid propagation in the rib 4a, and therefore, a noise insulation effect of the interior material 3 can be more enhanced.

Figure 2:
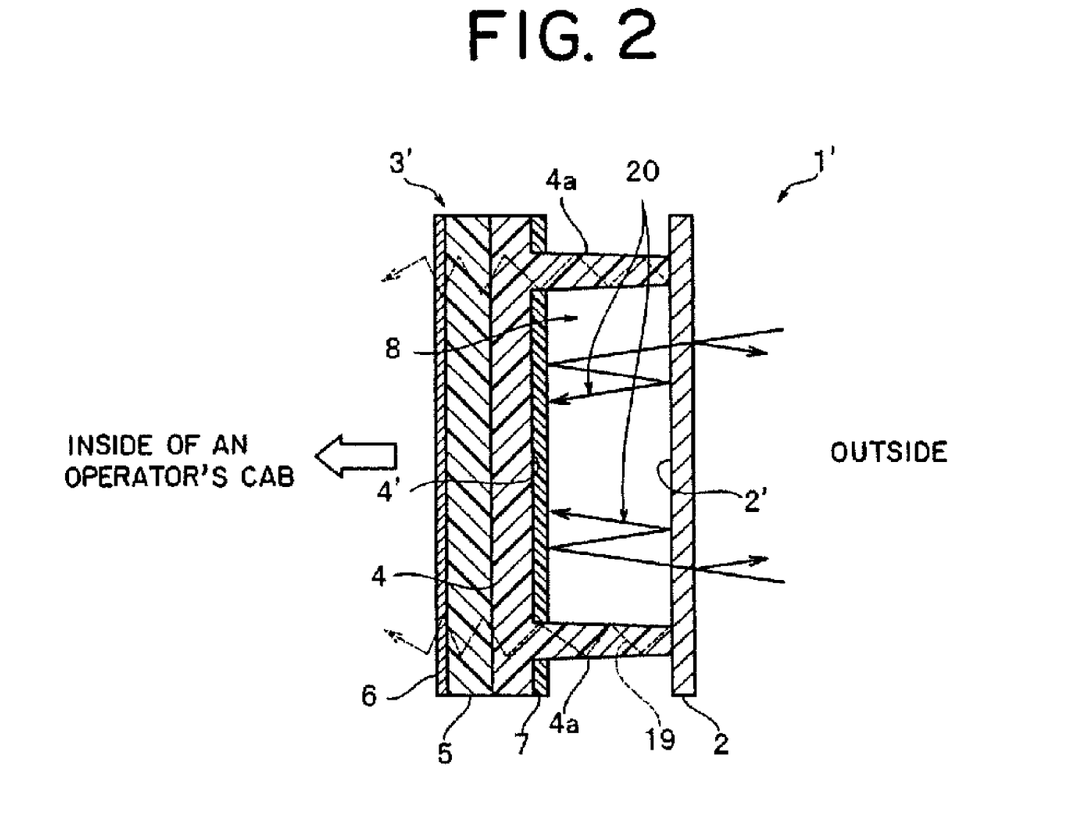
FIG. 2 is a schematic sectional view of a panel forming body having an interior material of another mode according to the present invention.

In contrast, according to the present invention, there can be provided an interior material 3' having a noise absorption layer 7 on an inside surface 4' of a structure member 4 and on a part of the surface of a rib 4a as shown in, for example, FIG. 2 as an interior material of another mode according to the embodiment. Further, there can be provided an interior material 3" having a noise absorption layer 7 on an inside surface 4' of a structure member 4 and on of an entire surface of a rib 4a as shown in, for example, FIG. 5 as an interior material of still another mode.

A panel forming body 1' shown in, for example, in FIG. 2 has a same configuration as the panel forming body 1 shown in FIG. 1 except that it has the interior material 3' having the noise absorption layer 7 on the inside surface 4' of the structure member 4 confronting the inside surface of an exterior material. The interior material 3' configured as described above has the noise absorption layer 7 on the inside surface 4' of the structure member 4 in a hollow portion 8. For this reason, when noise enters the hermetically sealed hollow portion 8 of the structure member 4 from the outside of the exterior material 2, the noise 20 which has entered the hollow portion 8 can be damped by being diffusely reflected repeatedly in the hollow portion 8 and absorbed by the noise absorption layer 7 on the inside surface 4' of the structure member 4, whereby a very excellent noise insulation effect can be obtained.

Figure 5:
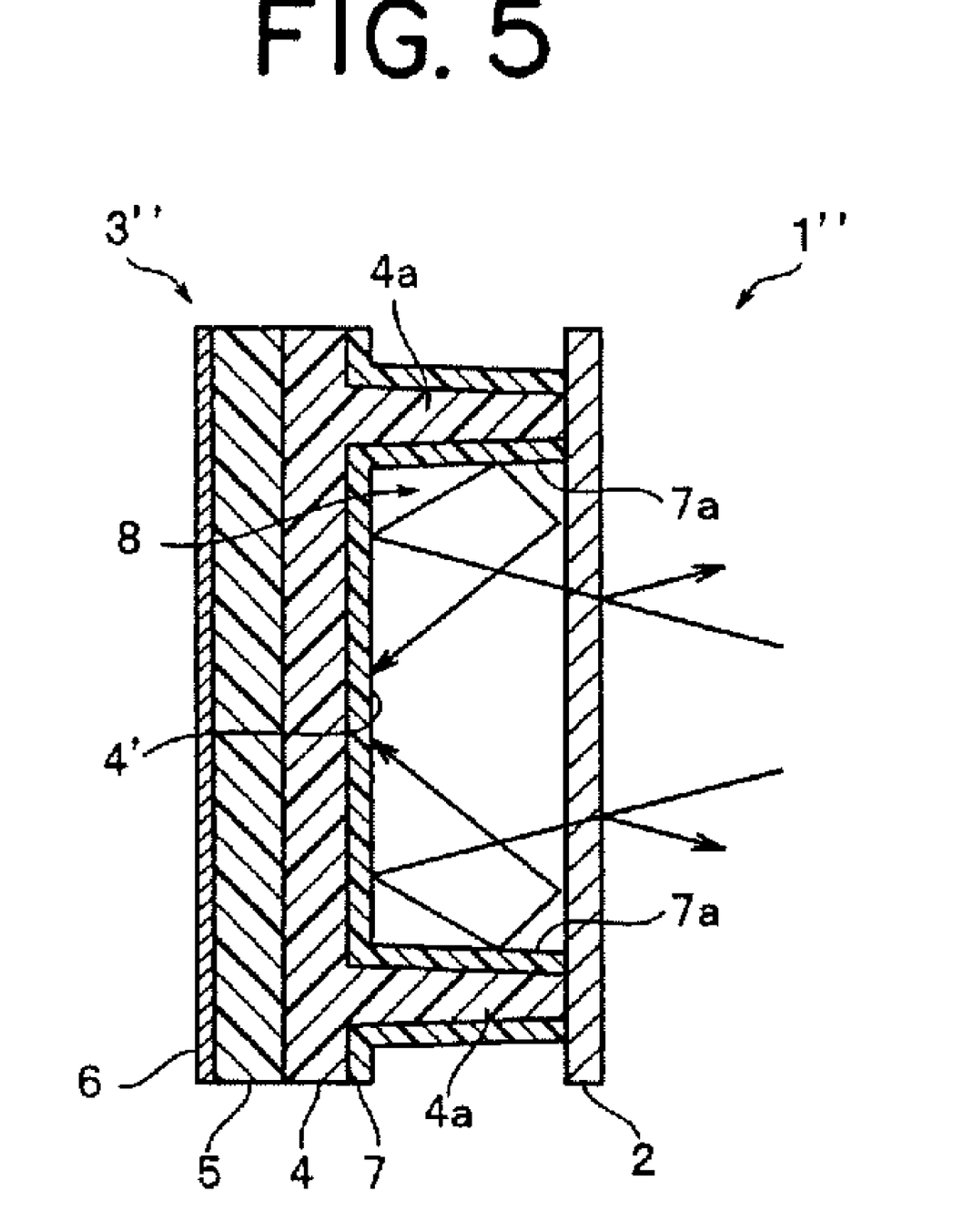
FIG. 5 is a schematic sectional view of a panel forming body having an interior material of still another mode according to the present invention.

Further, a panel forming body 1" shown in FIG. 5 has the same configuration as the panel forming body 1 shown in FIG. 1 except that it has the interior material 3" having noise absorption layers 7, 7' on the inside surface 4' of the structure member 4 and on the entire surface of the rib 4a. Since, in the interior material 3" configured as described above, the region of the noise absorption layer formed in a hollow portion 8 is more increased than the interior material 3', the interior material 3" can absorb the noise which has entered the hollow portion 8 by the noise absorption layers 7, 7', so that a more excellent noise insulation effect can be obtained.

That is, provision of the noise absorption layer 7 on the inside surface 4' of the structure member 4 as described above can enhance the noise insulation effect by the interior material. Further, the noise insulation effect can be more enhanced by attaching the noise absorption layer 7 on the inside surface 4' of the structure member 4 and the entire surface of the rib 4a, whereby an interior material having a very excellent noise insulation effect can be obtained.

To examine the noise insulation characteristics of the interior materials according to the embodiment, a following noise insulation test was executed based on a method of measuring an air noise insulation performance of a construction member in a laboratory based on JIS A1416 (ISO 140-3).

Figure 3:
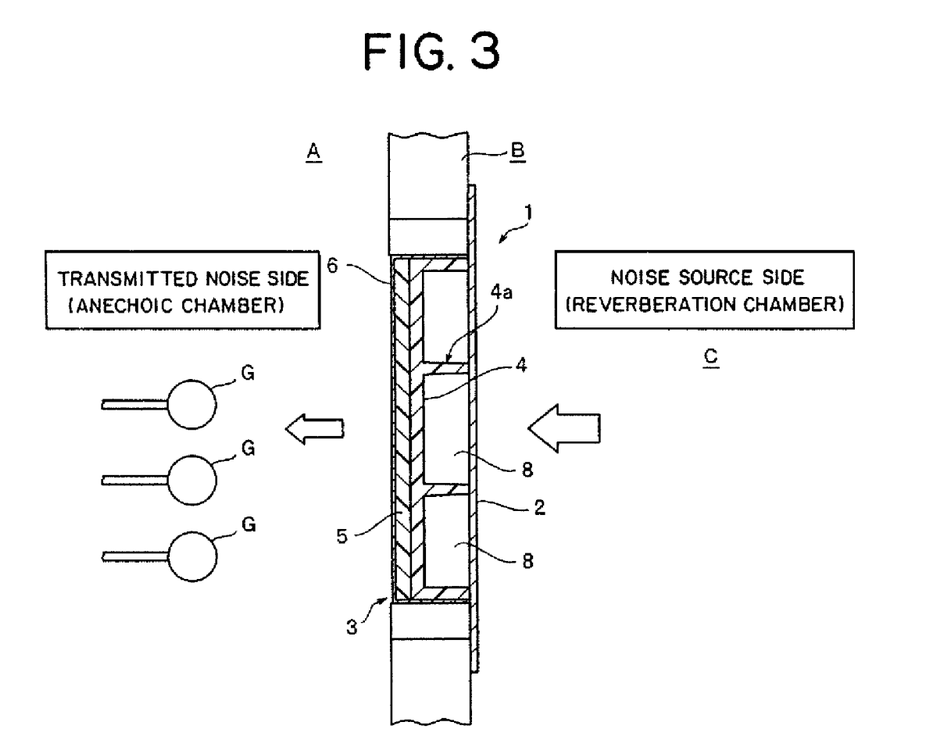
FIG. 3 is a schematic explanatory view explaining a method of a noise insulation test.

To briefly explain the method of the noise insulation test performed that time, a noise insulation wall B composed of a concrete block was interposed between an anechoic chamber A and a reverberation chamber C to partition them from each other as shown in, for example, FIG. 3, and a test panel forming body 1 was attached to the noise insulation wall B. A noise source (not shown) was disposed on a reverberation chamber C side, a plurality of microphones G were disposed in the anechoic chamber A in confrontation with the test panel forming body 1, and a periphery of the panel fitted to the wall B was filled with a joint to prevent a leakage of noise. In this state, a transmission loss was measured by using 1/f noise (pink noise) as the noise source that is more weaken in a higher frequency in inverse proportion to a frequency.

In this noise insulation test, measurement was executed by using the panel forming body 1 shown in FIG. 1 and the panel forming body 1' shown in FIG. 2 as the test panel forming body. Note that, in the panel forming body 1 (FIG. 1) used this time, a hot rolled steel sheet of 4.5 mm in thickness was used as the exterior material 2. Further, the interior material 3 was arranged such that a base portion of the structure member 4 had a thickness of 10 mm, the rib 4a had a height of 20 mm (substantially, a height of the hollow portion 8), and the noise absorption layer 5 had a thickness of 10 mm, and further trade name "PEF" (manufactured by Toray Industries, Inc.) was used as the surface clad material 6.

In addition, as the panel forming body 1' (FIG. 2), a panel forming body having a 5 mm thick noise absorption layer 7 formed on the inside surface 4' of the structure member 4 was used, in addition to a material and a dimension of the panel forming body 1. For comparison, the noise insulation test was also executed to a specimen, which was composed of a 4.5 mm thick hot rolled steel sheet having a 20 mm thick sound absorption material formed of a PET woolie fiber material and attached to one surface of the sheet, and to a specimen composed of a 4.5 mm thick simple hot rolled steel sheet (steel sheet having no sound absorption material attached thereto).

Figure 4:
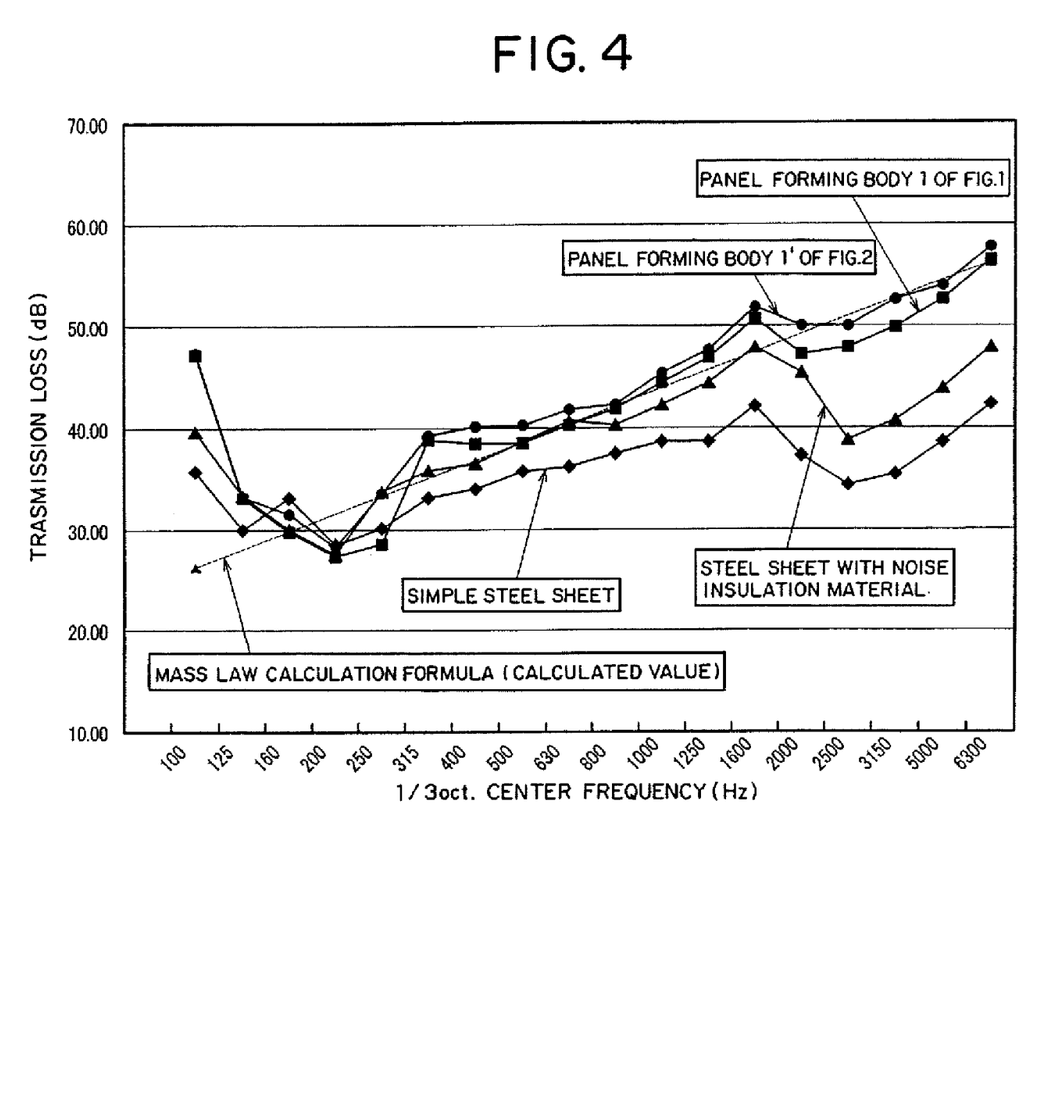
FIG. 4 is a graph showing a result of the noise insulation test.

FIG. 4 is a graph showing results of these noise insulation tests. Further, to verify results of noise insulation effects obtained by the noise insulation tests, FIG. 4 also shows a value obtained by calculating a transmission loss of a 4.5 mm thick hot rolled steel sheet based on a mass law calculation formula.

As apparent from the results of the tests shown in FIG. 4, it has been found that the panel forming body 1 having the hollow portion 8 formed by the interior material 3 as shown in FIG. 1 is more excellent in a noise insulation property than the simple steel sheet and the steel sheet having the noise insulation material attached thereto and has a transmission loss higher than a calculated value (shown by a broken line) obtained by the mass law calculation formula in a region in which ⅓ oct. center frequency is about 400 to 4000 Hz. Further, it has also been confirmed that the panel forming body 1' having the noise absorption layer 7 disposed on the inside surface 4' of the structure member 4 as shown in FIG. 2 has a noise insulation property more excellent than the panel forming body 1 of FIG. 1.

It has been confirmed from the results of the tests described above that when the panel forming body 1 is composed of the interior material 3 as shown in FIG. 1 which has the hollow portion 8 hermetically sealed by being provided with at least one rib 4a in intimate contact with the exterior material 2 and is provided with the noise absorption layer 5, noise entering from the outside of the exterior material 2 can be more effectively insulated than ever. Further, it has also been confirmed that provision of the noise absorption layer 7 on the inside surface 4' of the structure member 4 as shown in FIG. 2 more enhanced the noise insulation effect of the interior material. It can be determined from the above results that more excellent noise insulation characteristics can be obtained by disposing the noise absorption layer 7 on the inside surface 4' of the structure member 4 and on the surface of the rib 4a as shown in, for example, FIG. 5.

Figure 6:
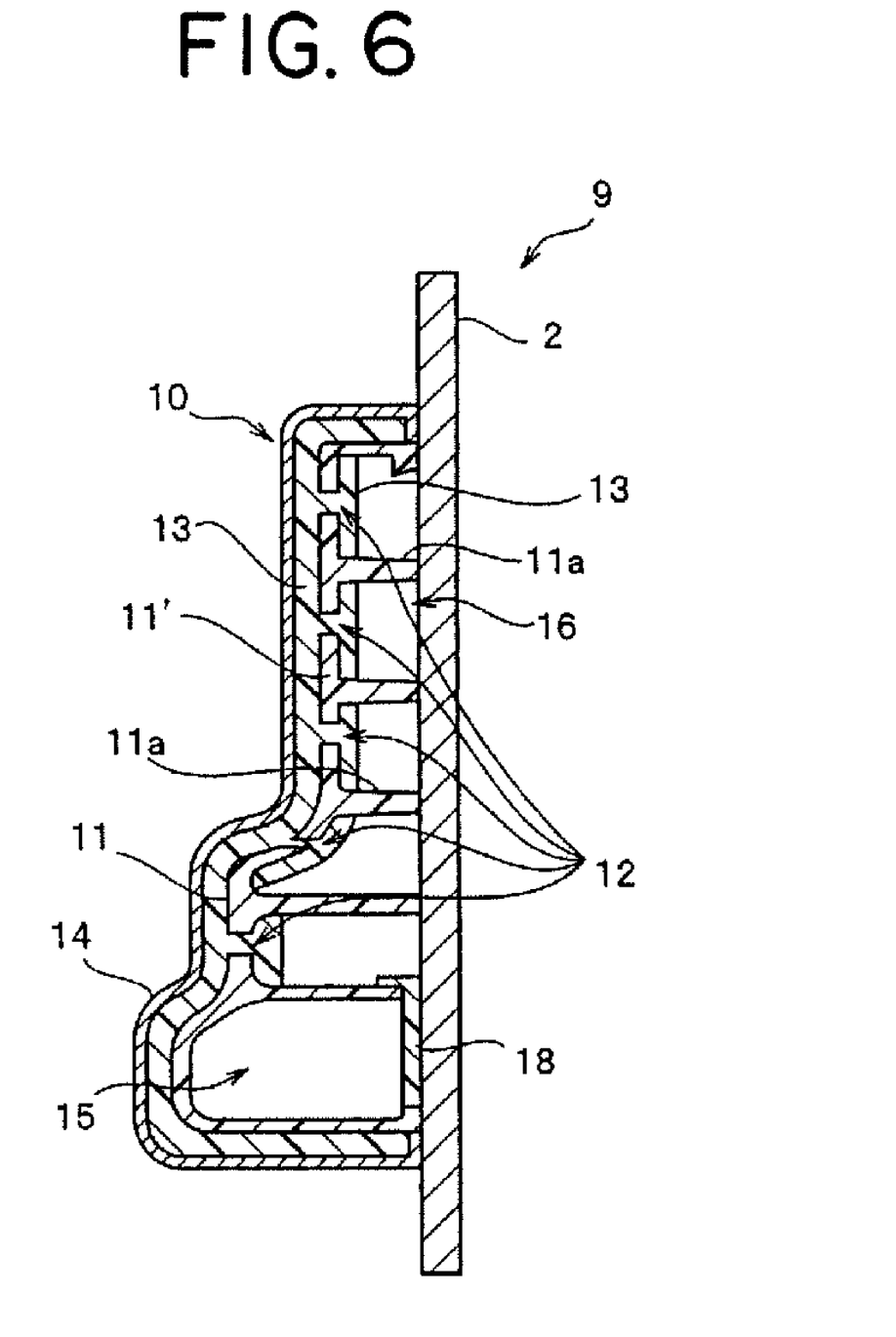
FIG. 6 is a schematic sectional view showing a more specific example of a panel forming body having an interior material.

Next, more specific embodiments of the interior material and the panel forming body according to the present invention will be explained in detail with reference to FIG. 6. FIG. 6 is a schematic sectional view schematically showing an example of a panel forming body for use in an operator's cab of a work machine.

A panel forming body 9 shown in FIG. 6 is configured by attaching an exterior material 2 composed of a hot rolled steel sheet to an interior material 10. At this time, the interior material 10 is formed in an outside dimension necessary to an interior of the operator's cab and has such a structure that an air conditioning duct 15 is assembled integrally therewith at a predetermined position. In the interior material 10, a structure member 11 for forming a basic bone structure thereof is molded of rigid foamed urethane, and a plurality of ribs 11a are formed on an inside surface of the structure member 11 integrally therewith vertically with respect to a base portion 11' of the structure member 11. Hermetically sealed hollow portions 16 are formed by bringing extreme ends of the ribs 11a into intimate contact with the exterior material 2.

Further, a plurality of holes 12, which pass through the base portion 11' from an outside surface thereof to an inside surface thereof, are formed in the structure member 11 such that a noise absorption layer 13 can be effectively formed on the inside surface of the structure member 11 in, for example, a process for manufacturing the interior material 10. Note that a lid member 18 is disposed to the interior material 10 as a member for closing an open portion of a duct forming section that is used to form the air conditioning duct 15.

In the above-described structure member 11, the noise absorption layer 13 is formed on each of the outside surface of the structure member 11 (surface of the structure member 11 opposite to an exterior material 2 side) and the inside surface thereof (surface of the structure member 11 confronting the exterior material 2) integrally therewith in a predetermined thickness. A foamed layer of a continuous foam member formed of any one of, for example, low repulsion urethane, semi-rigid urethane, PET resin, and polystyrene resin may be used as the noise absorption layer 13. Further, a surface clad material 14 is disposed on an operator's cab side surface of the noise absorption layer 13. For example, tradename "PEF" (manufactured by Toray Industries, Inc.) may be used as the surface clad material 14.

The interior material 10 configured as described above has a function for suppressing the vibration of the exterior material 2 generated by the ribs 11a, a function for damping the noise that is transmitted by the solid propagation in the ribs 11a and absorbing the noise by the noise absorption layers 13, and a function for diffusely reflecting and damping the noise that has entered the hollow portions 16 as well as absorbing the noise by the noise absorption layers 13 as described above. Accordingly, even if noise enters from, for example, the outside of the exterior material 2, the sound pressure level of the noise can be effectively reduced by the interior material 10.

Accordingly, in the operator's cab of the work machine externally covered with the panel forming body 9 having, for example, the interior material 10 as described above, an outside wall of the operator's cab can be surrounded by the panel forming body 9 except an open portion to which a window glass and the like are attached. With this arrangement, even in a place where noise is severely generated by an engine being driven, jobs such as excavation and lifting of soil, and the like, noise entering the operator's cab from the outside can be greatly reduced by the excellent noise insulation effect of the interior material 10. As a result, an influence of noise applied to an operator in the operator's cab can be greatly reduced, thereby a working environment can be significantly enhanced.

Further, since the interior material 10 according to the present embodiment can not only obtain the excellent noise insulation effect as described above but also can be molded to any arbitrary shape, a shape of the panel forming body 9 can be optionally designed according to a work machine to which the panel forming body is installed. Further, since the surface clad material 14 is disposed on an operator's cab side surface of the interior material 10, an effect of obtaining an excellent dwelling comfort can be also obtained by improving a decoration property and a feeling.

A specific application example, to which the interior material according to the embodiment described above is actually applied, will be explained here with reference to FIGS. 9(a) and 9(b). Note that FIG. 9(a) is a perspective outside appearance view of the specific application example of the interior material according to the embodiment, and FIG. 9(b) is a back view when the interior material is observed from a back surface side.

Figure 9A:
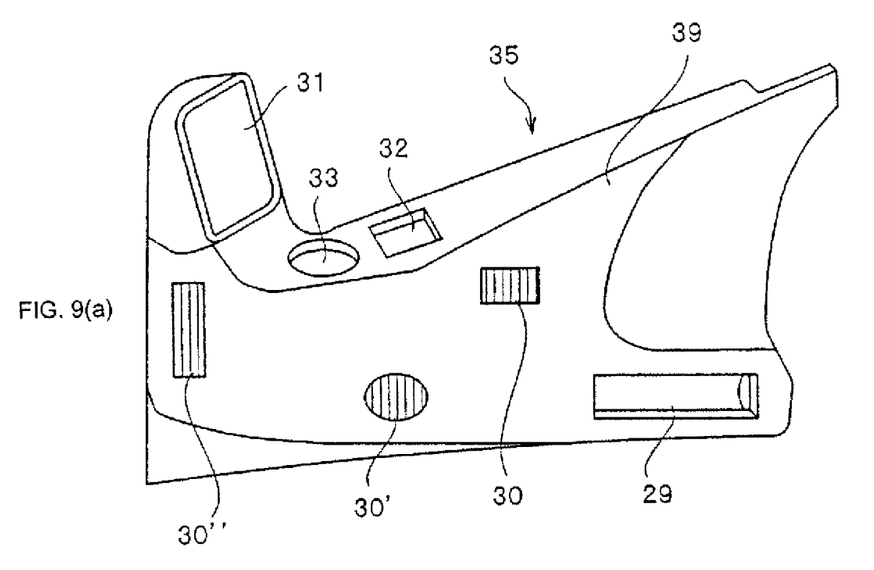
FIG. 9(a) is a perspective outside appearance view showing a specific application example of an interior material.
Figure 9B:
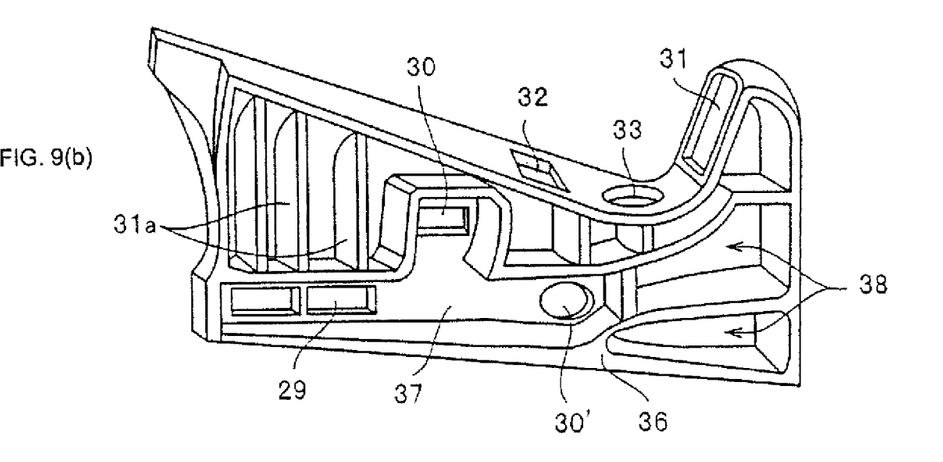
FIG. 9(b) is a back view when the interior material is observed from a back surface side.

An interior material 35 shown in FIG. 9 is disposed on a right side of an operator's cab in a construction machine, and includes a noise absorption layer (not shown) between a surface clad material 39 disposed on the operator's cab side and a structure member 36. A surface clad material having, for example, a good feeling of tough and an excellent design effect is used as the surface clad material 39 of the interior material 35 disposed on the operator's cab side.

In addition, in the structure member 36, a plurality of ribs 31a are disposed so as to come into intimate contact with an exterior material (not shown) attached to the interior material 35. Disposing the ribs 31a as described above permits hermetically sealed hollow portions to be easily formed when the exterior material is attached and provides the interior material 35 with strength by which an overall shape thereof can be stably maintained.

Further, an air conditioning duct 37 is formed in the structure member 36 as shown in FIG. 9(b) (note that FIG. 9(b) shows a state that no lid member is attached). The air conditioning duct 37 has a duct attachment port 29 to be connected to an air conditioner (not shown) and air supply openings 30, 30', 30" formed at arbitrary positions. A louver (not shown) is disposed to each of the air supply openings 30, 30', 30" which are integrally formed therewith or independently manufactured. Further, closed spaces 38 may be formed to the structure member 36, if necessary.

Furthermore, the interior material 35 may be integrally formed with accessories attachment portions, for example, a motor assembly portion 31 and the like, an ash tray assembly portion 32, a cup holder attachment portion 33, and the like at arbitrary positions.

Then, when the interior material 35 configured as described above is attached to the operator's cab of the work machine, the noise that enters the operator's cab from the outside can be greatly reduced by the excellent noise insulation effect of the interior material 35, whereby the work environment in the operator's cab can be significantly enhanced.

Next, a method of manufacturing the interior material 10 and the panel forming body 9 according to the embodiment will be explained in detail with reference to FIGS. 7(a), 7(b), 7(c) and 7(d). FIGS. 7(a)-7(d) are explanatory views schematically explaining the method of manufacturing the interior material 10 and the panel forming body 9.

Figure 7A:
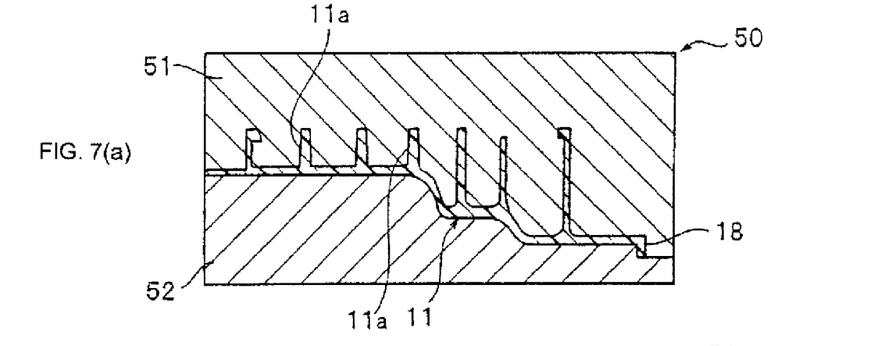
FIGS. 7(a)-7(d) are explanatory views explaining a method of manufacturing an interior material and a panel forming body.
Figure 7B:
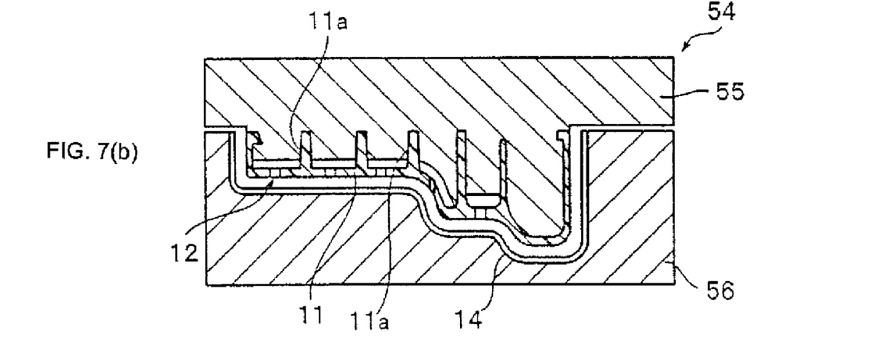

First, as shown in FIG. 7(a), a mold 50 is prepared to mold the structure member 11 of the interior material 10. The mold 50 is composed of an upper mold 51 and a lower mold 52 and designed with high accuracy such that the structure member 11 having a predetermined shape and at least one rib 11a can be molded. The structure member 11 having the rib 11a is molded with the mold 50 by injecting a material for constituting the structure member 11 (resin material) into a space (cavity) formed by the upper mold 51 and the lower mold 52 by an injection molding method.

To explain a case that the structure member 11 is formed of, for example, rigid foamed polyurethane, more specifically, isocyanate and a reactive resin material of polyol containing a foaming agent which are separately accommodated in material tanks by a low pressure dosing machine are first supplied into a mixing head (not shown) disposed just in front of the mold 50 in predetermined amounts respectively and mixed therein. When the reactive resin material is poured into the mold 50 at low pressure, a mechanism for rotating a stirring blade by an electric motor is disposed in, for example, the mixing head and the reactive resin material is mixed while being stirred.

In contrast, when the reactive resin material is poured at a high pressure dosing machine, no stirring mechanism is necessary, and the reactive resin material is mixed by collision. Thereafter, the mixed reactive resin material is injected into the cavity of the mold 50 from the mixing head at low temperature. At the time, it is possible to supply the polyol previously containing water as the foaming agent into the mixing chamber, or a catalyst, a curing agent, a foam stabilizer, and the like may be further added to the reactive resin material, if necessary.

Then, the reactive resin material supplied into the mold 50 can be foamed at low temperature with its reaction heat by being reacted in the cavity rapidly. Consequently, the structure member 11 composed of the rigid foamed polyurethane and having at least one rib 11a can be manufactured.

At this time, when the mold 50 is designed such that a lid member 18 used to form the air conditioning duct 15 described above can be also molded at a same time, the structure 49 member 11 and the lid member 18 can be effectively molded by a (reaction) injection molding process executed once.

Thereafter, the structure member 11 and the lid member 18 each having a desired shape can be obtained by taking out a molded body from the mold 50 and cutting off unnecessary portions. Note that at least one hole portion 12 passing through a base portion of the structure member 11 from an outside surface to an inside surface is previously provided to the structure member 11 before a noise absorption layer described below is molded. Incidentally, the hole portion 12 may be formed when the structure member 11 is molded. For example, a projecting portion whose end is in intimate contact with the lower mold 52 (or with the upper mold 51) is formed to the upper mold 51 (or to the lower mold 52) at a portion where the rib 11a of the structure member 11 is not disposed.

Next, the surface clad material 14 is manufactured to a predetermined thickness by a thermoforming method such as vacuum forming and the like. The method of manufacturing the surface clad material 14 is not particularly limited and may be manufactured by using a same method as that of a conventional method.

Subsequently, as shown in FIG. 7(a), a mold 54 composed of an upper mold 55 and a lower mold 56 which are designed in predetermined shapes to mold the noise absorption layer 13, is prepared, the structure member 11 with the rib 11a molded previously is attached to the upper mold 55, and the surface clad material 14 is attached to the lower mold 56 on a side thereof confronting the outside surface of the structure member 11. At this time, the structure member 11 can be easily attached to the upper mold 55 by, for example, attaching a magnet to the upper mold 55 and attaching a metal clip and the like to the structure member 11. In contrast, the noise absorption layer 13 can be attached to the lower mold 56 in a very intimate contact state by, for example, forming a single or a plurality of openings as required to the lower mold 56 so that they pass through the lower mold 56 from the outside thereof to the surface thereof in contact with the surface clad material 14, connecting the openings to a suction mechanism, and sucking the air in the openings.

Figure 7C:
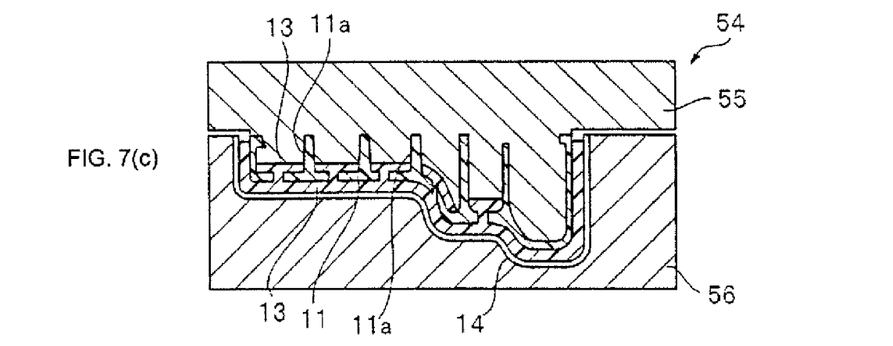
Figure 7D:
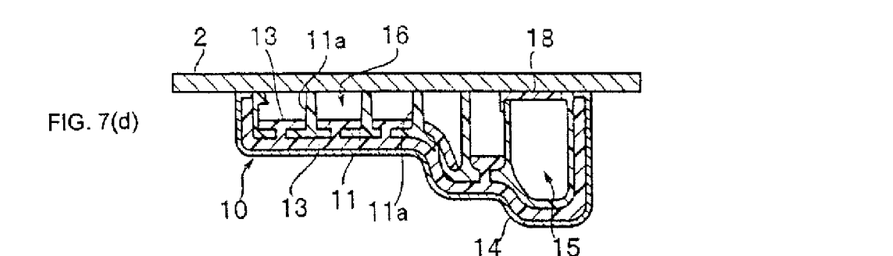

After the structure member 11 and the surface clad material 14 are attached to the upper mold 55 and the lower mold 56, respectively, a material constituting the noise absorption layer 13 (resin material) is injected into a cavity formed between the structure member 11 and the surface clad material 14 to form the noise absorption layer 13 between the structure member 11 and the surface clad material 14 as shown in FIG. 7(c). At this time, the noise absorption layer 13 can be also molded simultaneously on the inside surface of the structure member 11 by supplying the resin material from the outside surface side to the inside surface side of the structure member 11 through the hole portion 12 formed in the structure member 11. Note that, when, for example, the noise absorption layer 13 is formed on the inside surface of the structure member 11 and the entire surface of the rib, it is necessary only to change a shape of the cavity formed in the upper mold 55.

A molded product, in which the structure member 11, the noise absorption layer 13, and the surface clad material 14 are integrated, can be obtained by (reaction) injection-molding the noise absorption layer 13 as described above. Thereafter, the interior material 10 according to the embodiment can be obtained by, for example, bending a portion of the surface clad material 14 protruding from the noise absorption layer 13 to a noise absorption layer 13 side and bonding the portion. Even if, for example, the structure member 11 and the noise absorption layer have complicated shapes, the interior material 10 can be obtained stably at low cost by manufacturing the interior material 10 as described above.

In the interior material 10 obtained as described above, the lid member 18, which has been molded simultaneously at a time of molding the structure member 11 previously, is joined to a released portion of a duct forming section by using an adhesive and the like to form the air conditioning duct 15. Thereafter, the interior material 10 can be integrated with the exterior material 2 by fixedly attaching an extreme end of a peripheral wall portion of the interior material 10 to the exterior material 2 by an adhesive and the like.

At this time, when, for example, an attachment seat previously formed on an exterior material 2 side is coupled with the extreme end of the peripheral wall portion of the interior material 10 by using a fastener, the interior material 10 can be more strongly joined to the exterior material 2. In addition to the above mentioned, the interior material 10 can be also integrated with the exterior material 2 by providing the exterior material 2 with, for example, an attachment seat piece of a clip and fitting the attachment seat piece to a metal clip previously attached to the structure member 11.

At this time, it is sufficient for the rib 11a standing from the inside surface of the structure member 11 to come into intimate contact with the exterior material 2, and the rib 11a may be fixedly attached to the exterior material 2 by an adhesive or may be simply abutted against the exterior material 2 according to an object. The panel forming body 9 excellent in a noise insulation property can be easily manufactured at low cost by integrating the interior material 10 with the exterior material 2 as described above.

Note that a case in which the noise absorption layer 13 is formed on the inside surface of the structure member 11 by forming the hole portion 12 in the structure member 11 has been explained above. However, as another method, the noise absorption layer 13 can be also formed by, for example, coating the surface of the inside surface of the structure member 11 and the part of the surface or the entire surface of the rib with the noise absorption layer 13 by using a spray after the structure member 11 is molded. Further, when the noise absorption layer 13 is formed of, for example, a continuous foam body, the noise absorption layer 13 can be formed by making use of foam in situ. In contrast, when the noise absorption layer is formed on neither the inside surface of the structure member 4 nor the surface of the rib as in, for example, the panel forming body 1 shown in FIG. 1, the process for forming the hole portion 12 can be omitted.

INDUSTRIAL APPLICABILITY

The interior material of the present invention can be applied to an interior material of an operator's cab of work machines, work vehicles, and the like such as civil engineering/construction, agricultural, and other industrial machines, vehicles.

What is claimed is:

1. A method for manufacturing an interior material of an operator's cab for a work machine, the interior material comprising at least a structure member and a noise absorption layer disposed on an outside surface of the structure member, wherein the structure member has a rib which stands from an inside surface of a base portion thereof and comes into intimate contact with an inside surface of an exterior material, and a hermetically sealed hollow portion is formed by the rib in intimate contact with the exterior material, the method comprising:

forming the structure member having at least one rib in a desired shape by an injection-molding method;

forming at least one hole portion in the structure member, the hole portion passing through the base portion from an outside surface thereof to the inside surface thereof when or after the structure member is molded;

attaching the structure member in which the hole portion has been formed to a mold; and     molding a noise absorption layer on the outside surface of the structure member using the mold by injecting a material constituting the noise absorption layer onto the outside surface of the structure member, and at the same time, forming the noise absorption layer on the inside surface of the structure member and on a part of a surface or an entire surface of the rib through the hole portion.

2. The method for manufacturing an interior material according to claim 1, comprising, when the noise absorption layer is (reaction) injection-molded (RIM):

previously attaching a surface clad material to a side of the mold confronting the outside surface of the structure member; and     (reaction) injecting the material constituting the noise absorption layer into an interval between the structure member and the surface clad material attached to the mold.

* * * * *